United States Patent [19]
Chi

[11] Patent Number: 5,701,435
[45] Date of Patent: Dec. 23, 1997

[54] INSTRUCTION CACHE SYSTEM FOR IMPLEMENTING PROGRAMS HAVING NON-SEQUENTIAL INSTRUCTIONS AND METHOD OF IMPLEMENTING SAME

[75] Inventor: Chi-Hung Chi, Croton-on-Hudson, N.Y.

[73] Assignee: Philips Electronics North America Corporation, New York, N.Y.

[21] Appl. No.: 63,845

[22] Filed: May 19, 1993

Related U.S. Application Data

[63] Continuation of Ser. No. 500,612, Mar. 27, 1990, abandoned.

[51] Int. Cl.$^6$ .............................................. G06F 12/12
[52] U.S. Cl. ............... 395/486; 395/800; 395/588; 395/580; 395/383; 395/452; 395/460
[58] Field of Search ............................ 395/425, 400, 395/600, 800, 700, 375, 421, 588, 383, 580, 445, 452, 460, 482, 462, 486

[56] References Cited

U.S. PATENT DOCUMENTS

| | | | |
|---|---|---|---|
| 4,157,587 | 6/1979 | Joyce et al. | 364/200 |
| 4,189,770 | 2/1980 | Gannon et al. | 364/200 |
| 4,437,149 | 3/1984 | Pomerene et al. | 364/200 |
| 4,500,954 | 2/1985 | Nuke et al. | 364/200 |
| 4,594,659 | 6/1986 | Guenther et al. | 364/200 |
| 4,626,988 | 12/1986 | George | 395/375 |
| 4,691,277 | 9/1987 | Kronstadt | 364/200 |
| 4,761,731 | 8/1988 | Webb | 364/200 |
| 4,802,085 | 1/1989 | Levy et al. | 395/425 |
| 4,807,110 | 2/1989 | Pomerene et al. | 364/200 |
| 4,851,993 | 7/1989 | Chen et al. | 364/200 |
| 4,860,197 | 8/1989 | Langendorf et al. | 364/200 |
| 4,876,642 | 10/1989 | Gibson | 395/375 |
| 4,894,772 | 1/1990 | Langendorf | 364/200 |
| 4,937,738 | 6/1990 | Uchiyama et al. | 364/200 |
| 4,942,518 | 7/1990 | Weatherford et al. | 364/200 |
| 4,943,908 | 7/1990 | Emma et al. | 364/200 |
| 5,025,366 | 6/1991 | Baror | 395/425 |
| 5,099,419 | 3/1992 | Norama | 395/375 |
| 5,113,370 | 5/1992 | Tomita | 395/375 |

OTHER PUBLICATIONS

Chi et al. "Compiler-Driver Cache Policy"; Jun. 1987, Purdue Univ.
Alpert; "Performance Trade-offs for Microprocessor Cache Memories" IEEE Micro Aug. 1988.
Cytron et al.; "Automatic Management of Programable Caches" IEEE Aug. 1988.
Furht et al; "A Compiler Directed Cache Strategy for GaAs Microprocessor Architecture" Mar. 1988; IEEE.
Chi et al. "Improving Cache Performance by Selective Cache Bypass"; IEEE Jan. 1989.
McNiven et al. "Analysis of Memory Referencing Behavior For Design of Local Memories" IEEE 1988.

*Primary Examiner*—Larry D. Donaghue

[57] ABSTRACT

A system for increasing the speed and efficiency of instruction execution by a computer processing system. An instruction cache is provided to receive a minor number of stored instructions for execution by the computer processing system. The instructions are prefetched and returned in cache based upon an analysis of instructions which are in the cache pending execution. Target instructions of branch instructions may be prefetched as a result of the analysis of a branch instruction pending in the cache. Other instructions may be retained in cache when they are tagged as being likely to be reused.

5 Claims, 2 Drawing Sheets

```
PROCESSOR = PROCESSING UNIT = CPU
P BUFFER = PREFETCHED BUFFER
C BUFFER = CURRENT BUFFER
INSTRUCTION CACHE = ICACHE
MEMORY = MAIN MEMORY = GLOBAL MEMORY
```

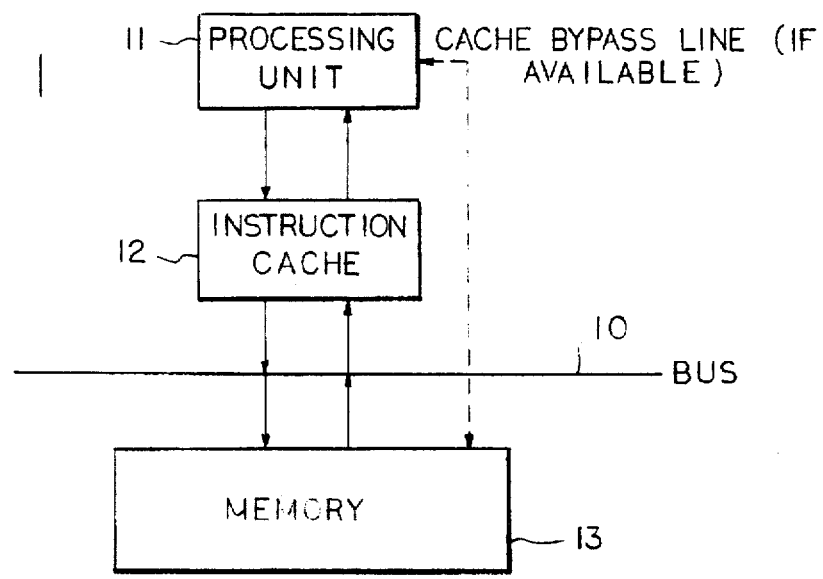

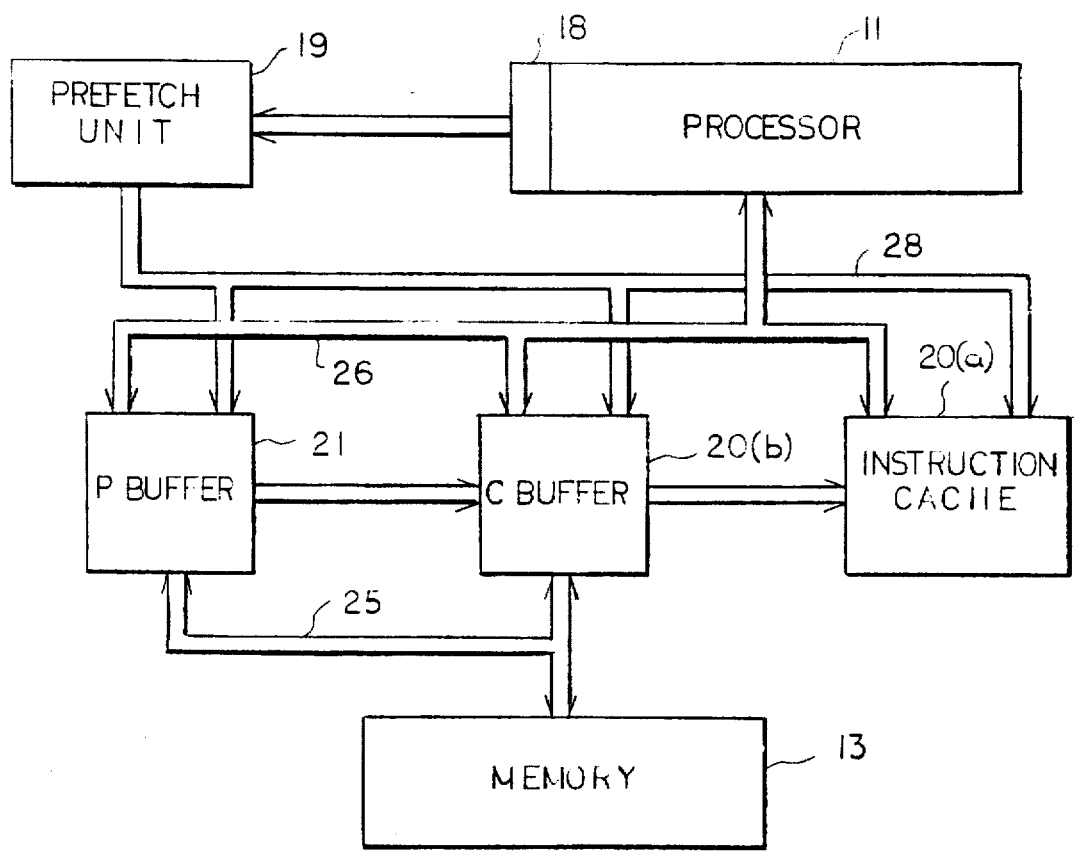

INSTRUCTION CACHE SYSTEM FOR IMPLEMENTING PROGRAMS HAVING NON-SEQUENTIAL INSTRUCTIONS AND METHOD OF IMPLEMENTING SAME

This is a continuation of application Ser. No. 07/500,612, filed Mar. 27, 1990 now abandoned.

This invention relates to computer processing systems which make use of instruction cache memories to increase instruction access speed. Specifically, a method and apparatus for reducing instruction cache misses without increasing instruction cache pollution is described.

Stored memory programs are implemented in computer processing systems which are executed by sequential instruction line execution. The retrieval of a line of instructions from memory necessarily requires access to the system bus slowing the overall computation time for the computer.

To alleviate the bus overhead in line by line program execution, instruction caches have been used which permit prefetching of groups of lines of instructions during some cycle(s) of the memory bus. The processor may then reference a line of instruction from the cache without regard for the bus availability.

Some programs are not entirely sequential in that they have branch instructions or loop instructions which transfer execution to an earlier instruction. If instructions are prefetched on a sequential basis, a cache miss might occur when the next instruction is a target instruction of branch instructions. The cache must then use some bus cycle(s) to acquire the referenced instruction.

The prefetching of instructions for execution may also present the additional problem of cache pollution, wherein lines of instructions are prefetched into the cache and never used. The result is wasted cache memory space and the increased potential for a cache miss due to non-referenced instructions being stored in the cache.

One solution to this dilemma is a cache prefetching operation based on a one line look ahead. When a cache miss occurs, the reference line and next consecutive line of instructions are prefetched in the next available bus access. This scheme does not verify whether the next line will actually be used, thus presenting the possibility of polluting the cache rather than enhancing its performance.

SUMMARY OF THE INVENTION

It is an object of this invention to provide efficient prefetching of instructions from a program memory to an instruction cache.

It is yet another object of this invention to compile a computer program to avoid cache misses during execution of the program.

It is still another object of this invention to manage an instruction execution cache to avoid pollution of the cache with unused instructions.

These and other objects of the invention are provided by an instruction execution cache which prefetches during an available bus cycle a plurality of instructions from a main program storage memory. The fetched instructions are examined by a prefetch processor to determine the likelihood of a cache miss by the computer during sequential execution of the prefetched instructions.

This prediction of a cache miss is based upon determining whether or not an instruction such as a branch instruction has been loaded in the cache. Since these instruction types result in the program execution being non-sequential, forcing execution to a target instruction, the next instructions to be prefetched include the target instruction.

Additionally, when instructions are known to belong to a group of repetitively executed instructions, the portion of the instruction cache containing repetitively executed instructions is maintained frozen, i.e., in a state wherein they can be read and cannot be overwritten. Thus, it is possible to keep the beginning instructions of a program block which have a high probability of reuse in cache for repetitive use.

In carrying out the invention, explicit instructions may be inserted in the program to require a prefetch of the target instructions of a branch instruction in the next available bus cycle. An instruction to freeze and unfreeze instructions in cache may be inserted in the program to identify when these measures are to be taken.

DESCRIPTION OF THE FIGURES

FIG. 1 illustrates a cache memory interface between a program memory 13 and processing unit 11.

FIG. 2 illustrates the program organization in memory 13 which provides for explicit prefetching of target instructions before execution of a branch instruction.

FIG. 3 illustrates the program organization in memory 13 which provides for cache instruction freezing.

FIG. 4 illustrates the cache instruction contents during program execution having instructions which are frozen.

FIG. 5 illustrates a computing system architecture for implementing the cache instruction prefetching according to the instruction flow of FIGS. 2 and 3.

DESCRIPTION OF THE PREFERRED EMBODIMENT

Referring now to FIG. 1, there is shown an instruction processing unit (IPU) which is common to many computer processing system architectures. Although shown as a single operating system, it is clear and well known to use the instruction cache interface between a processing unit 11 and program memory 13 for parallel operating systems. Such instruction cache arrangements are demonstrated in the Convex Computer Corporation CI processor series literature.

The instruction cache 12 permits the processing unit 11 to prefetch a number of instruction for execution during an available bus cycle of the computer bus 10. The prefetched instructions are stored in the instruction cache 12, thus freeing the bus to be used for other tasks to be performed by the processing unit 11. By freeing up the bus 10 from instruction fetching operations, the overall processing speed may be improved by permitting the bus 10 to service other demands for the processing unit 11.

In a typical system operation, the processing unit 11 may fetch one or more lines of instructions from the memory 13. The lines of instruction in turn contain a plurality of words, each of which may correspond to a single sub-instruction for the line of instructions.

The fetched instructions located in the cache 12 are then sequentially processed by the processing unit 11. As most programs are written in terms of a series of blocks of instructions, having a single entry and exit point, a sequential prefetching of the instructions will often provide the necessary series of instruction in the cache 12 for execution.

During execution of the instructions by the processing unit 11, when the last word of a particular instruction line is referenced by the processing unit 11, preparatory to executing the instruction, the processing unit 11 checks for the next following line to determine whether or not it is in the instruction cache 12. A cache prefetch for the next line of instructions following the line containing the last word to be executed is issued if it is not in the instruction cache 12.

Certain conditional branch instructions alter the execution sequence of the processing unit 11. Thus, in the case of an "if" statement or other type of branch instruction, the next needed instruction is likely one which may have been previously fetched and which has since been discarded in the instruction cache 12.

In one embodiment of the present invention, the instruction cache 12 will not prefetch the next instruction from memory 13 when a branch instruction has been prefetched. However, if the instruction is an uncondition branch instruction, a prefetch bit may be set in the instruction cache 12, allowing the next consecutive instruction to be prefetched during the next available bus cycle.

Once a conditional branch instruction is executed, a bus cycle for bus 10 may be needed to fetch the particular target instruction. Thus, no prefetching is resumed in the instruction cache 12 until the branch instruction has been executed.

This particular scheme of inhibiting prefetching, when a conditional branch instruction is set to be executed, avoids the inevitable cache miss which will occur should a sequential instruction be fetched from the program memory 13 before a conditional branch instruction is executed, transferring control to its related target instruction which is probably not the next sequential instruction.

The foregoing prefetching conditions may be implemented by analylzing the program behavior in light of branch instructions, and other events which require the execution of instructions which are non-sequential. By anticipating that future references by the processing unit 11 to instructions of the stored program of memory 13 may not be sequential, it is possible to avoid polluting the instruction cache 12 with non-used instructions without incurring any additional risk of a cache miss 12 by interrupting the sequential prefetching of program instructions.

In implementing the foregoing technique, a conditional branch instruction may be encountered which changes the program execution sequence to another line perhaps ahead of those being executed. To avoid implicitly prefetching instructions, which immediately follow such a conditional branch instruction, the branch instruction is inspected and if it is a conditional branch, the cache prefetch bit is set to inhibit prefetching of subsequent branch instructions until the branch instruction is executed. Once the branch instruction is executed, and the processing unit 11 correctly identifies and references the target instruction from memory 13, prefetching may once again commence in the sequential manner until further branch instructions are encountered.

The foregoing techniques for deciding when to prefetch, on a sequential basis, instructions contained in a program memory 13, works well within blocks of instructions comprising the program. By recognizing when programs are not to be executed sequentially, the instruction cache may avoid a miss and avoid unnecessarily prefetching instructions which will not be used. This conserves bus cycle time, as well as polluting the instruction cache 12 with unused instructions.

Control over prefetching may also be effected by including explicit prefetch instructions at various points in the program, identifying to the cache and computer processor an instruction address to be executed and which is non-sequential.

FIG. 2 illustrates the memory 13 organization of a series of program instructions which are a part of a block beginning with instruction address 001. At address 010, there is a branch instruction, identifying a conditional target which is the beginning of the instruction block identified by address 001. Thus, sequential execution occurs for lines of instruction located at addresses 001 through 009.

Also shown in the block which begins with address 001 is an explicit prefetch instruction at address 009. The explicit prefetch instruction, when executed by the computer processor, will identify to the cache the instruction located at address 001, before the branch instruction is executed by the processor 11. Thus, by prefetching address 001, the target instruction for branch instruction at address 010 will be available in cache and avoid a miss before the execution of the branch instruction. Sequential prefetching may continue from address 001 at the next available bus cycle, permitting continued sequential prefetching of the instructions in memory 13.

Use of the explicit prefetch instruction is advantageous at the end of loops, wherein the program counter for the processor 11 would naturally jump back to the start of the loop. Branch instructions at the end of a loop are conditional, and, although a program instruction execution will eventually leave the loop, the higher probability is that the program instruction execution sequence will remain within the loop. Obviously, once the branch instruction 010 has been satisfied, and instruction 011 is to be executed, a miss will occur in the cache when the processor references the instruction 011. However, the miss penalty under this condition is far outweighed by prefetching the higher probability beginning loop instruction.

Subroutines contained within the program of memory 13 also cause a change in execution sequence, from a sequential instruction to a displaced instruction. The explicit prefetch instruction can be used when divergence instructions are encountered, such as "if" statements. Conditional instructions may also be preceded by a prefetch instruction to advantageously prefetch a non-sequential target instruction.

In selecting a location of a prefetch instruction, vis a vis, a branch instruction, such as to permit sufficient time for prefetching the required target instruction before execution of the branch instruction, the prefetch instruction should be located a number of instructions away from the branch instruction to permit ample prefetch time. In FIG. 2, this is illustrated as being only one address earlier.

It is also possible to include more than one prefetch instruction, identifying a second target from a branch instruction. This would then provide prefetched targets which would be available once the branch instruction is executed.

Overuse of the prefetch instructions for all branch instructions is to be avoided. It is clear that by inserting prefetch instructions that the branch target is prefetched ahead of execution, whether or not that branch target may be needed. This is additional bus cycle overhead to prefetch an instruction which may ultimately not be used.

It is clear that those skilled in the programming arts may selectively insert explicit cache prefetch instructions for those branch instructions which have a higher probability of having a cache miss for their branch targets. This would include branches which have a target with an absolute displacement from the branch instruction which is greater than the cache size. Employing the prefetch instruction for these conditions will reduce the probability of a cache miss without overburdening the bus 10 with instruction prefetches which are unnecessary. By observing the foregoing principle, that when a branch instruction requires transfer of program execution to an instruction having a displacement from the branch instruction greater than the cache size, the probability of having that branch target in cache is very low unless the instruction is explicitly fetched.

The foregoing techniques of providing explicit cache prefetching may be accomplished by using some hardware decoding logic in the instruction cache 12. By decoding the OPCODE of each prefetched instruction, it is possible to determine the presence of a branch instruction. When the OPCODE detection indicates that the instruction is part of an unconditional branch instruction, the sequential cache prefetch is stopped, and a prefetch of the branch target identified by the branch instruction is started. If the OPCODE is part of some condition branch instruction, instructions from different branch targets are prefetched according to any predetermined probability of executing those branches.

This predecoding of instructions prefetched in the instruction cache is to be distinguished from conventional techniques for prefetching branch instructions from a branch instruction currently being decoded and executed by the processor. In the prior art technique, any latency between detection of a branch OPCODE and actual use of the branch target would be very small. The present solution, however, proposes to inspect instructions which are in the instruction cache, before execution, prefetching branch targets based on the OPCODE decoding. Other techniques which take advantage of a pre-analysis of the program stored in the program memory 13 include selectively freezing the contents of the instruction cache 18. Using the foregoing sequential prefetching as the normal prefetch mode, it is possible to freeze elements of a block of instructions, in the instruction cache 12, which are likely to be used again. Rather than explicitly referencing back to these instructions, which were once used and then discarded, they are maintained in the instruction cache and may be read only and not replaced while the program is executing within the block.

Selective cache line freezing is useful in situations wherein the cache replacement policy is LRU (least recently used). In this circumstance, the last instruction to be used in the cache is replaced with the next prefetched instruction. Thus, when sequentially executing a block of instruction containing a loop having a size greater than the cache size, the loop instructions are continuously and sequentially fetched into the cache, referenced by the processor only once, and then immediately replaced before they are referenced again. This promotes an inefficient prefetching and demands on bus cycle time by constantly prefetching instructions which were reused only a few execution cycles earlier.

Referring to FIG. 3, there is shown a sequence of program instructions beginning with address 000 through address 100, which illustrates the process of freezing commonly used instructions. Contained within the block of program instructions of FIG. 3 is a branch instruction at address 010. By including a freeze bit with instruction 1, which may be a target instruction for the branch instruction at address 010, it is possible to hold this instruction in the cache and not permit it to be replaced until the program exits the loop to a higher numbered instruction. An unfreeze, explicit instruction may be located at address 011, which, after the loop has been completed within the block represented by instructions at addresses 001 through 010, permits these frozen instructions to be discarded on subsequent prefetch cycles.

FIG. 4 illustrates how instructions at addresses 001, 002 and 003 may be frozen in a portion of the cache, permitting prefetching only in lines 4, 5 and 6 of the cache. In this way, as the sequential prefetching of instructions from addresses 001 through 003 commence, they will be loaded into the cache and frozen. Instructions at addresses 004 through 009 will be prefetched, preferably two at a time, during subsequent available bus cycles, and executed by the processor. At the time of prefetching of the branch instruction at address 010, the instructions at addresses 001, 002 and 003 will have been frozen in the first three line portions of the cache. Thus, since 001 is a target of branch instruction at address 010, prefetching of the target instructions will not be necessary. Further, no prefetching will be necessary until instruction 003 has been executed, wherein the remaining sequential instructions at addresses 004 through 010 may be inserted in the unfrozen portion of the cache. Once the unfreeze instruction 011 has been referenced by the processor as a result of execution of the branch instruction, indicating that the loop is completed, the unfreeze instruction will permit all six (6) locations in the instruction cache to be used in sequential prefetching of further instructions.

To select which lines of a cache should be frozen, the following criteria should be considered.

The entry line of a basic block has the highest priority to be frozen in the cache. If the block of instructions includes a loop which has as its target the entry line of a basic block (a commonly encountered situation), no branch target prefetching will be necessary for loop execution of the entry line is frozen in the cache. By freezing the first one or two entry lines of a block of instructions, it is clear that when the processor references the target, i.e., the entry line, the instruction cache will already contain the requested instruction. This consequence will not only reduce bus traffic, but eliminate the need for explicit cache instruction to prefetch the branch target, or any extra hardware decoding for conducting OPCODE inspection.

The cache should be selectively frozen in such a way that the frozen cache lines and the implicit cache prefetching for the unfrozen portion of the cache are distributed uniformly across those instructions constituting a loop. The size of the frozen portion of the instruction cache should be as large as possible, being certain that the free unfrozen portion is sufficiently large to handle the remaining instructions of a loop.

FIG. 5 illustrates the architecture for implementing an instruction cache having a portion which can be frozen, i.e., only read and a portion which may be freely written and read. The processor 11 is shown having a program counter 18 which identifies the address of the next instruction to be executed. A prefetch unit 19, which is itself a processor, is shown which will supervise the prefetching of lines of instruction from memory 13, based upon the program counter 18 and the foregoing prefetching techniques.

Assuming that the entry instruction for a block of instructions has been identified by program counter 18 for the first time, i.e., a loop has not yet been entered, the prefetch unit 19 will determine whether or not the line has been previously prefetched, and is available in either the prefetch buffer 21, current buffer 20(b), or instruction cache 20(a). The prefetching unit 19 will generate a line request in response to the program counter 18 to be certain the next required instruction is available for the processor 11. The prefetching unit will initially check all the buffer units, i.e., P buffer 21, C buffer 20(b) and instruction cache 20(a) to determine whether a line containing the desired instruction is in one of these units. If there is a cache hit on any one of the buffer units, i.e., the requested instruction is present in these units, there is no prefetch necessary, and no request is made of the memory 13 for the instruction.

If a cache miss occurs, a prefetch request will be sent to the main memory on the next available time slot for bus 25. When the prefetched line arrives, which is normally the next sequential line or pairs of lines in a two line prefetch mode, they are inserted in the P buffer 21. The newly arrived lines replace the least recently used line of instructions, according to the LRU criteria.

When the processing unit issues the request for the next available instruction, as determined by program counter 18, all the buffers will be searched for the requisite instruction. If the requisite instruction is found on the prefetched buffer, the reference line is transferred to the current buffer. If the referenced line is found in the current buffer, all the contents of the buffers will remain the same. If the instruction requested is found in the instruction cache 20(a), the content of all the buffers remains unchanged.

The instruction cache 20(a) serves as a portion of the instruction cache which can be frozen. The free portion of the instruction cache is that denoted C buffer by 20(b).

The system of FIG. 5 will prefetch instructions from the memory 13 depending on the counter 18. When a hit is made by processor 11 on the P buffer 21, the referenced line is transferred to the current buffer. This will continue until the current buffer is full. Once the current buffer 20(b) is full, the LRU rule is invoked to transfer the least referenced instruction to the instruction cache 20(a) if the instruction cache is not frozen. If the instruction cache 20(a) is frozen, any line replaced from the C buffer 20(b) will not be put in instruction cache 20(a). Thus, once a freeze instruction has been executed by processor 11, the instruction cache 20(a) is frozen, thus retaining the previously fetched instructions therein. These will advantageously be the early lines of a loop of an instruction block or other such target instruction. The C buffer 20(b) is free to receive further prefetched instructions via the P buffer 21.

Thus, there are described several embodiments of an overall system for controlling prefetching of instructions from an instruction memory 13. These cache management techniques will reduce the required bus access time for prefetching instructions, while reducing the overall number of cache misses. Those skilled in the art will recognize yet other embodiments of the invention described more particularly by the claims which follow.

What is claimed is:

1. In a processing system for executing program instructions stored in a memory and forming subgroups of blocks of instructions, at least one of said blocks including a group of instructions which are repeatedly executed, a system for improving execution efficiency of said program comprising:

an instruction cache for storing a minor number of instructions of a block of said instructions; and a prefetch processor programmed to sequentially fetch a number of instructions of said program from the memory and store the number of instructions in said instruction cache, said processor controlling said cache to freeze a portion of said cache containing said instructions which are repeatedly executed, while prefetching sequentially remaining instructions of said program, said prefetch processor being operative to inspect instructions, fetched from the memory to control the freezing.

2. The system of claim 1 wherein said prefetch processor freezes the instructions representing the beginning portion of a block containing said repeatedly executed instructions.

3. The system of claim 1 wherein said repeatedly executed instructions are tagged, and said prefetch processor detects said tagged instructions and subsequently freezes said tagged instructions in said cache.

4. The system of claim 3 wherein said program includes an instruction which unfreezes said cache.

5. The system of claim 4 wherein all of said program instructions include a bit position which identifies an instruction as an instruction to be frozen or which is not to be frozen.

* * * * *